(12) United States Patent
Yagi et al.

(10) Patent No.: US 11,047,995 B2
(45) Date of Patent: Jun. 29, 2021

(54) RADIATION IMAGING APPARATUS AND RADIATION IMAGING SYSTEM

(71) Applicant: CANON KABUSHIKI KAISHA, Tokyo (JP)

(72) Inventors: Tomoyuki Yagi, Chofu (JP); Yutaka Ishinari, Yokohama (JP); Kai Suzuki, Kawasaki (JP); Yuki Iwabuchi, Kawasaki (JP); Yoshiaki Ishii, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 16/598,551

(22) Filed: Oct. 10, 2019

(65) Prior Publication Data
US 2020/0124747 A1    Apr. 23, 2020

(30) Foreign Application Priority Data

Oct. 22, 2018 (JP) .............................. JP2018-198711

(51) Int. Cl.
*G01T 1/208* (2006.01)

(52) U.S. Cl.
CPC .................... *G01T 1/208* (2013.01)

(58) Field of Classification Search
CPC .... G01T 1/208; H04N 5/3698; H04N 5/3577; H04N 5/32
See application file for complete search history.

(56) References Cited

U.S. PATENT DOCUMENTS

| | | | |
|---|---|---|---|
| 7,342,221 B2 | 3/2008 | Takenaka et al. |
| 7,343,000 B2 | 3/2008 | Kameshima et al. |
| 7,381,963 B2 | 6/2008 | Endo et al. |
| 7,386,089 B2 | 6/2008 | Endo et al. |
| 7,403,594 B2 | 7/2008 | Endo et al. |
| 7,421,063 B2 | 9/2008 | Takenaka et al. |
| 7,442,939 B2 | 10/2008 | Yagi et al. |
| 7,514,663 B2 | 4/2009 | Yagi et al. |
| 7,532,706 B2 | 5/2009 | Kameshima et al. |
| 7,541,591 B2 | 6/2009 | Endo et al. |
| 7,573,038 B2 | 8/2009 | Yokoyama et al. |
| 7,613,277 B2 | 11/2009 | Takenaka et al. |
| 7,683,337 B2 | 3/2010 | Takenaka et al. |
| 7,718,973 B2 | 5/2010 | Endo et al. |

(Continued)

FOREIGN PATENT DOCUMENTS

JP    2010-268171    11/2010

OTHER PUBLICATIONS

U.S. Appl. No. 16/580,049, First Named Inventor Toshikazu Tamura, filed Sep. 24, 2019.

*Primary Examiner* — Marcus H Taningco
(74) *Attorney, Agent, or Firm* — Venable LLP (57) ABSTRACT

A radiation imaging apparatus includes a pixel array arranged with a plurality of pixels including conversion units configured to convert radiation into charges and accumulate the charges, a bias line connected to the conversion units of the plurality of pixels, a bias circuit configured to supply a bias potential to the bias line and detect a current flowing in the bias line, a noise reduction circuit configured to reduce, separately from the bias circuit, noise included in the bias potential from the bias circuit, and a switch configured to connect the noise reduction circuit to the bias line.

9 Claims, 12 Drawing Sheets

(56) References Cited

U.S. PATENT DOCUMENTS

| | | |
|---|---|---|
| 7,724,874 B2 | 5/2010 | Kameshima et al. |
| 7,732,776 B2 | 6/2010 | Takenaka et al. |
| 7,750,309 B2 | 7/2010 | Endo et al. |
| 7,786,448 B2 | 8/2010 | Endo et al. |
| 7,791,034 B2 | 9/2010 | Kameshima et al. |
| 7,791,035 B2 | 9/2010 | Yokoyama et al. |
| 7,847,263 B2 | 12/2010 | Yagi et al. |
| 7,869,568 B2 | 1/2011 | Yokoyama et al. |
| 7,872,218 B2 | 1/2011 | Endo et al. |
| 7,880,145 B2 | 2/2011 | Yagi et al. |
| 7,965,817 B2 | 6/2011 | Kameshima et al. |
| 7,994,481 B2 | 8/2011 | Yagi et al. |
| 8,093,562 B2 | 1/2012 | Yokoyama et al. |
| 8,107,588 B2 | 1/2012 | Kameshima et al. |
| 8,167,486 B2 | 5/2012 | Takenaka et al. |
| 8,222,611 B2 | 7/2012 | Yagi et al. |
| 8,247,779 B2 | 8/2012 | Kameshima et al. |
| 8,576,294 B2 | 11/2013 | Kameshima et al. |
| 8,723,996 B2 | 5/2014 | Yokoyama et al. |
| 8,792,024 B2 | 7/2014 | Takenaka et al. |
| 8,809,795 B2 | 8/2014 | Takenaka et al. |
| 8,829,438 B2 | 9/2014 | Sato et al. |
| 9,048,154 B2 | 6/2015 | Takenaka et al. |
| 9,128,196 B2 | 9/2015 | Sato et al. |
| 9,134,432 B2 | 9/2015 | Iwashita et al. |
| 9,234,966 B2 | 1/2016 | Sugawara et al. |
| 9,423,512 B2 | 8/2016 | Sato et al. |
| 9,445,030 B2 | 9/2016 | Yagi et al. |
| 9,462,989 B2 | 10/2016 | Takenaka et al. |
| 9,468,414 B2 | 10/2016 | Ryu et al. |
| 9,470,800 B2 | 10/2016 | Iwashita et al. |
| 9,470,802 B2 | 10/2016 | Okada et al. |
| 9,541,653 B2 | 1/2017 | Iwashita et al. |
| 9,655,586 B2 | 5/2017 | Yagi et al. |
| 9,812,474 B2 | 11/2017 | Yagi et al. |
| 9,971,046 B2 | 5/2018 | Ryu et al. |
| 9,980,685 B2 | 5/2018 | Iwashita et al. |
| 9,989,656 B2 | 6/2018 | Sato et al. |
| 10,009,990 B2 | 6/2018 | Takenaka et al. |
| 10,197,684 B2 | 2/2019 | Terui et al. |
| 10,274,612 B2 | 4/2019 | Ishii et al. |
| 10,349,914 B2 | 7/2019 | Takenaka et al. |
| 10,416,323 B2 | 9/2019 | Ryu et al. |
| 2009/0218501 A1* | 9/2009 | Kondou ............... H04N 5/32 250/370.09 |
| 2010/0148080 A1 | 6/2010 | Endo et al. |
| 2011/0204248 A1* | 8/2011 | Seino ............... G01T 1/17 250/371 |
| 2011/0317054 A1 | 12/2011 | Kameshima et al. |
| 2014/0239186 A1 | 8/2014 | Sato et al. |
| 2014/0361189 A1 | 12/2014 | Kameshima et al. |
| 2016/0270755 A1 | 9/2016 | Takenaka et al. |
| 2016/0370225 A1* | 12/2016 | Iwashita ............... H04N 5/32 |
| 2018/0063933 A1 | 3/2018 | Okada et al. |
| 2018/0128755 A1 | 5/2018 | Iwashita et al. |
| 2018/0129120 A1 | 5/2018 | Sato et al. |
| 2018/0317868 A1 | 11/2018 | Terui et al. |
| 2018/0328862 A1 | 11/2018 | Sato et al. |
| 2019/0020834 A1* | 1/2019 | Osawa ............... H04N 5/3698 |
| 2019/0029618 A1 | 1/2019 | Sato et al. |

\* cited by examiner

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

There is a radiation imaging apparatus formed by combining a pixel array on which pixels including conversion units for converting radiation into charges and switch elements such as a thin-film transistor are two dimensionally arrayed, a driving circuit of the switch elements, and a circuit which reads out signals from the conversion units. Such a radiation imaging apparatus is widely used in an X-ray image diagnosis apparatus and is used for performing video imaging such as fluoroscopy, still imaging of the chest, and the like. Among such radiation imaging apparatuses, there is an apparatus that has a radiation exposure detection function. This function allows the imaging operation of the radiation imaging apparatus to be controlled by detecting the start of radiation exposure without the exchange of control signals between the radiation imaging apparatus and a radiation generation apparatus.

A radiation imaging apparatus disclosed in Japanese Patent Laid-Open No. 2010-268171 detects the start of radiation exposure based on a current that flows in a bias line that supplies a bias voltage to each conversion unit. When an image capturing operation is performed by using a radiation imaging apparatus that detects the start of radiation exposure based on a current that flows in a bias line, noise can appear in the captured image in some cases.

SUMMARY OF THE INVENTION

The present invention has been made in consideration of the above situation, and provides a technique that suppresses noise from appearing in an image captured by a radiation imaging apparatus.

According to an aspect of the present invention, the present invention provides a radiation imaging apparatus comprising: a pixel array arranged with a plurality of pixels including conversion units configured to convert radiation into charges and accumulate the charges; a bias line connected to the conversion units of the plurality of pixels; a bias circuit configured to supply a bias potential to the bias line and detect a current flowing in the bias line; a noise reduction circuit configured to reduce, separately from the bias circuit, noise included in the bias potential from the bias circuit; and a switch configured to connect the noise reduction circuit to the bias line.

Further features of the present invention will become apparent from the following description of exemplary embodiments with reference to the attached drawings.

DESCRIPTION OF THE EMBODIMENTS

Exemplary embodiments of the present invention will be described in detail hereinafter with reference to the accompanying drawings. The same reference numerals denote the same components throughout the various embodiments, and a repetitive description thereof will be omitted. In the present invention, light includes visible light and infrared rays, and radiation includes X-rays, $\alpha$-rays, $\beta$-rays, and $\gamma$-rays.

The outline of a radiation imaging system using a radiation imaging apparatus of the present invention will be described with reference to FIGS. 1A and 1B. The radiation imaging system includes a radiation generation apparatus 200 and a radiation imaging apparatus 300. The radiation generation apparatus 200 includes a radiation source 1, an exposure control unit 5, and a first communication unit 6, and the radiation imaging apparatus 300 includes a pixel array 4, an image capturing control unit 7, and a second communication unit 8. In the execution of an image capturing operation, radiation 3 generated from the radiation source 1 under the instruction of the exposure control unit 5 is transmitted through an object 2 and enters the pixel array 4, and the radiation transmitted through the object is converted into electrical signals by conversion units 12 arranged in the pixel array, and the electrical signals are processed. The pixel array 4 includes a plurality of photoelectric conversion units 110 that are two-dimensionally arranged so as to form an array having a plurality of rows and a plurality of columns, a substrate 100 supporting the photoelectric conversion units 110, and a scintillator 190. In the example shown in FIG. 1A, the scintillator 190, the photoelectric conversion units 110, and the substrate 100 are arranged in this order in the pixel array 4 when viewed from the incident direction of the radiation 3. Although each conversion unit 12 according to the embodiment has an indirect structure that converts radiation into visible light by the scintillator 190 and converts light into an electrical signal by the corresponding photoelectric conversion unit 110, it may be arranged so that each conversion unit will directly convert radiation into an electrical signal.

Each conversion unit 12 includes the photoelectric conversion unit 110 and the scintillator 190. In this example, the scintillator 190 can be shared by the plurality of conversion units 12. The image capturing control unit 7 mainly controls the driving of the pixel array 4 and the readout of electrical signals from the photoelectric conversion units 110. A bias circuit 9 mainly has a function of supplying a bias potential to each photoelectric conversion unit 110 and detecting a current which flows in a bias line. The first communication unit 6 and the second communication unit 8 perform communication for controlling image capturing between the exposure control unit 5 and the image capturing control unit 7. The communication units 6 and 8 can be used to synchronize the exposure operation and the image capturing operation. The synchronization may be performed by transmitting a synchronization signal for synchronizing the exposure timing and the image capturing timing to the radiation generation apparatus 200 and the radiation imaging apparatus 300. In this case, the synchronization signal may be generated by the image capturing control unit 7 or generated by arranging a common synchronization signal generation unit in the radiation generation apparatus 200 and the radiation imaging apparatus 300. The radiation imaging system can control the image capturing operation by using the bias circuit 9 included in the radiation imaging apparatus 300 to detect the start of radiation exposure based on a current flowing in the bias line.

Figure 1A:
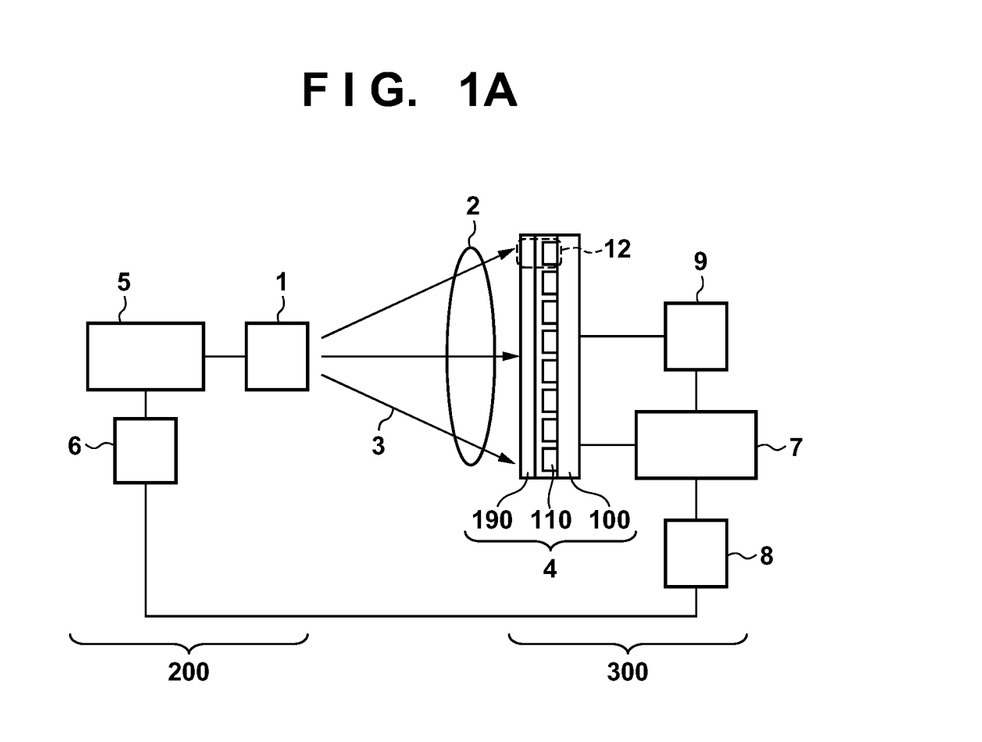
FIGS. 1A and 1B are views showing a radiation imaging system.
Figure 1B:
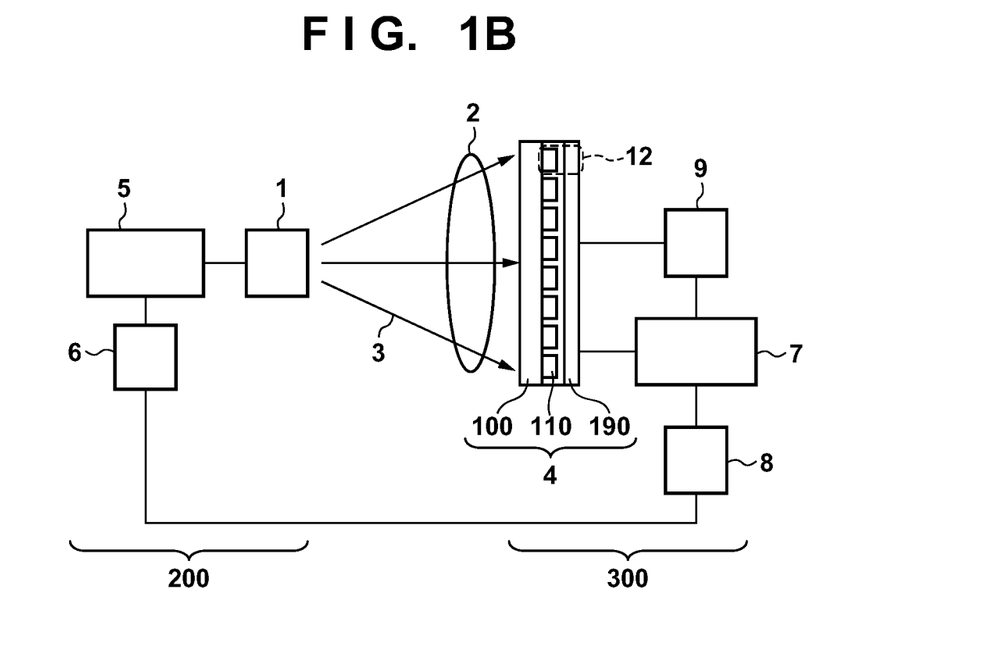

The example shown in FIG. 1B differs from the example shown in FIG. 1A in the point that the incident direction of the radiation 3 with respect to the pixel array 4 has been set on the opposite side. The substrate 100 is faced toward the side of radiation source 1, and the radiation 3 enters the scintillator 190 by passing an array formed by the substrate 100 and the plurality of photoelectric conversion units 110 in this order. The light converted by the scintillator 190 enters the photoelectric conversion units 110.

First Embodiment

Figure 2:
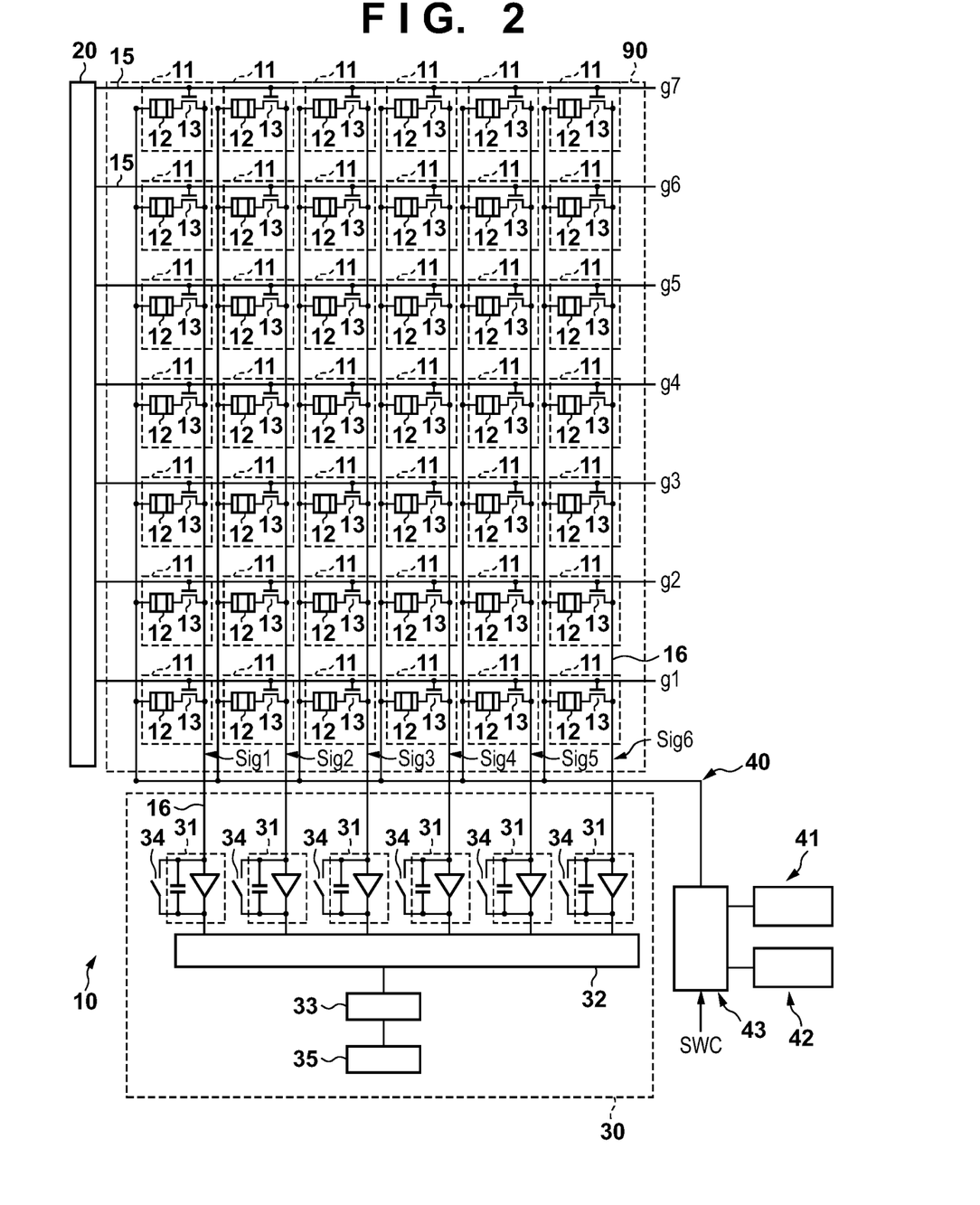
FIG. 2 is a circuit diagram showing a radiation imaging apparatus according to the first embodiment.

A radiation imaging apparatus 300 according to this embodiment will be described with reference to FIG. 2. A plurality of pixels 11 for obtaining a radiation image are arranged two-dimensionally in an image capturing region 90 so as to form an array having a plurality of rows and a plurality of columns. Note that although only 7 rows and 6 columns of pixels and 6 column selection lines 16 are shown for the sake of descriptive convenience in FIG. 2, there may be 6 or more column signal lines. For example, the radiation imaging apparatus may have a pixel count corresponding to a size of 2,800 rows and 2,800 columns.

Each pixel 11 includes a conversion unit 12 that converts radiation into an electrical signal and a switch 13. As described above, each conversion unit 12 may be formed by the photoelectric conversion unit 110 and the scintillator 190 or be formed by a unit that directly converts radiation into an electrical signal. The conversion unit 12 can include a first electrode (which can also be referred to as a discrete electrode or a readout electrode) and a second electrode (which can also be referred to as a common electrode). The switch 13 can be, for example, a thin-film transistor (TFT). The first electrode is connected to one primary terminal of the switch 13 and the other primary terminal of the switch 13 is connected to a corresponding one of the column selection lines 16 indicated by reference symbols Sig1 to Sig6. The control terminal (gate terminal) of the switch 13 is connected to a corresponding one of row selection lines 15. The second electrode of the photoelectric conversion unit 110 is connected to a bias line 40 to provide the bias potential to the conversion unit 12.

The bias circuit according to this embodiment includes a first bias circuit 41 and a second bias circuit 42. A bias potential is supplied to the bias line 40 from the first bias circuit 41 or the second bias circuit 42 via a bias switching circuit 43. The bias switching circuit 43 selects either the first bias circuit 41 or the second bias circuit 42 based on a control signal SWC from the image capturing control unit 7, and supplies a bias potential transmitted from one of these bias circuits to the bias line 40. The bias potential is supplied, to the common electrodes of the conversion units 12 arranged in an array, from the bias line 40 arranged along in the row direction via bias lines arranged in the column direction and branching from the bias line 40 for each column. In this embodiment, the first bias circuit 41 is a bias circuit that has a function of detecting a bias current flowing in the bias line, and the second bias circuit 42 is a bias circuit that does not have the function of detecting the bias current.

The radiation imaging apparatus 300 further includes a row selection unit 20 and a processing unit 30. The row selection unit 20 selects, among the plurality of row selection lines 15 denoted by reference symbols g1 to g7, each row which is selected by driving the corresponding row selection line 15 to the active level. The switch 13 connected to the row selection line 15 is set to the conductive state when the row selection line 15 is driven to the active level, and the first electrode of each conversion unit 12 belonging to the selected row is connected to the corresponding column selection line 16. As a result, a signal accumulated in each conversion unit of the selected row can be read out to the corresponding column selection line 16. Binning and readout of signals from a plurality of pixels can be performed by selecting a plurality of rows at once.

The processing unit 30 can include amplifiers 31, a multiplexer 32, an A/D converter 33, reset switches 34, and an operation unit 35. The amplifiers 31 detect and amplify signals output to the column selection lines 16. Each amplifier 31 can be, for example, an integrating amplifier. A plurality of amplifiers 31 are arranged in the processing unit 30 so that one amplifier 31 will correspond to one column selection line 16. Each reset switch 34 causes a short circuit between the input terminal and the output terminal to reset the corresponding amplifier 31 and the potential of the corresponding column selection line 16.

The multiplexer 32 sequentially selects the plurality of amplifiers 31 and outputs an output signal from the selected amplifier 31 to the A/D converter 33. The A/D converter 33 converts the signal (analog signal) output from the multiplexer 32 into a digital signal. The operation unit 35 processes the signal output from the A/D converter 33 and outputs the processed result outside. The operation unit 35 can process the signal output from the A/D converter 33 before or after the radiation irradiation operation. In addition, the operation unit 35 may also directly output the signal output from the A/D converter 33.

Figure 3:
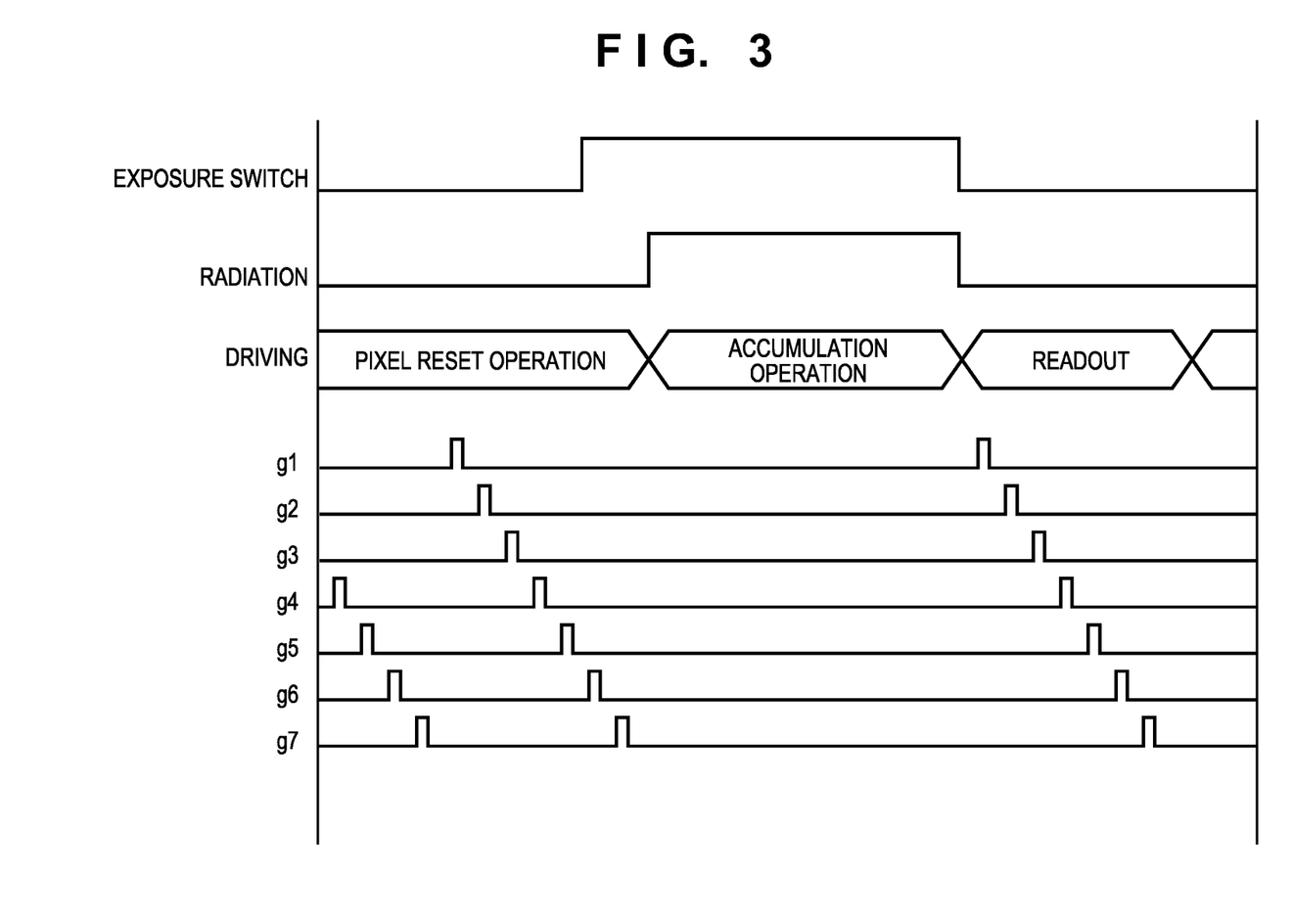
FIG. 3 is a timing chart of the radiation imaging apparatus according to the first embodiment.

The outline of the image capturing operation according to the embodiment will be described below with reference to FIG. 3. The row selection unit 20 sequentially sets the row selection lines 15 (g1 to g7) to active level to set the switches 13 of the corresponding pixels 11 in a conductive state to reset the pixels 11 until radiation irradiation is started by the radiation imaging apparatus 300 of the present invention. This is done to reduce the influence of dark charge accumulation in each photoelectric conversion unit 110. A semiconductor unit is used in each photoelectric conversion unit 110. Since charges (dark charges) due to heat are generated in each photoelectric conversion unit 110, dark charges are accumulated in the capacitance portion of the photoelectric conversion unit 110 when the switch 13 is left in the non-conductive state. If radiation exposure and image readout are performed in a state in which the dark charges are accumulated, the image quality of the captured image degrades because the accumulated dark charges will be added to the radiation signal that has been transmitted through the object. Hence, during the period until radiation exposure is started, the row selection lines 15 are sequentially set to the active level to reset the dark charges accumulated in the photoelectric conversion units 110 to reduce the influence of dark charges on image quality. In particular, a photoelectric conversion unit, which is formed by arranging amorphous silicon or an amorphous silicon nitride film on an insulating substrate such as glass, is often used as each pixel of a large flat-panel radiation imaging apparatus. Since dark charges are easily generated in a photoelectric conversion unit made of such materials due to the characteristics of the materials, resetting of pixels need to be performed particularly before radiation exposure is started.

When a radiation exposure instruction is input to the exposure control unit 5 from an exposure switch, radiation 3 is emitted from a radiation source 1. When radiation source 1 is controlled by the exposure control unit 5 and the radiation exposure is started, the radiation imaging apparatus 300 sets all of the row selection lines 15 in the non-active level and causes the photoelectric conversion units 110 to accumulate charges generated by the light from the scintillator 190. When the radiation exposure is stopped, signals are read out from the photoelectric conversion units 110. Readout is performed when the row selection lines 15 are sequentially set to the active level by the row selection unit 20, and the switches 13 of the pixels belonging to the row set to the active level are set to the conductive state with their respective column selection lines 16. When each switch 13 is set to the conductive state, charges accumulated in the corresponding conversion unit 12 are transferred to the amplifier 31 via the column selection line 16. The transferred charges are converted into a voltage and transmitted to the A/D converter 33, further converted from a voltage into digital data by the A/D converter 33, and ultimately output after being processed by the operation unit 35. The basic image capturing operation is performed in this manner as described above.

Figure 4:
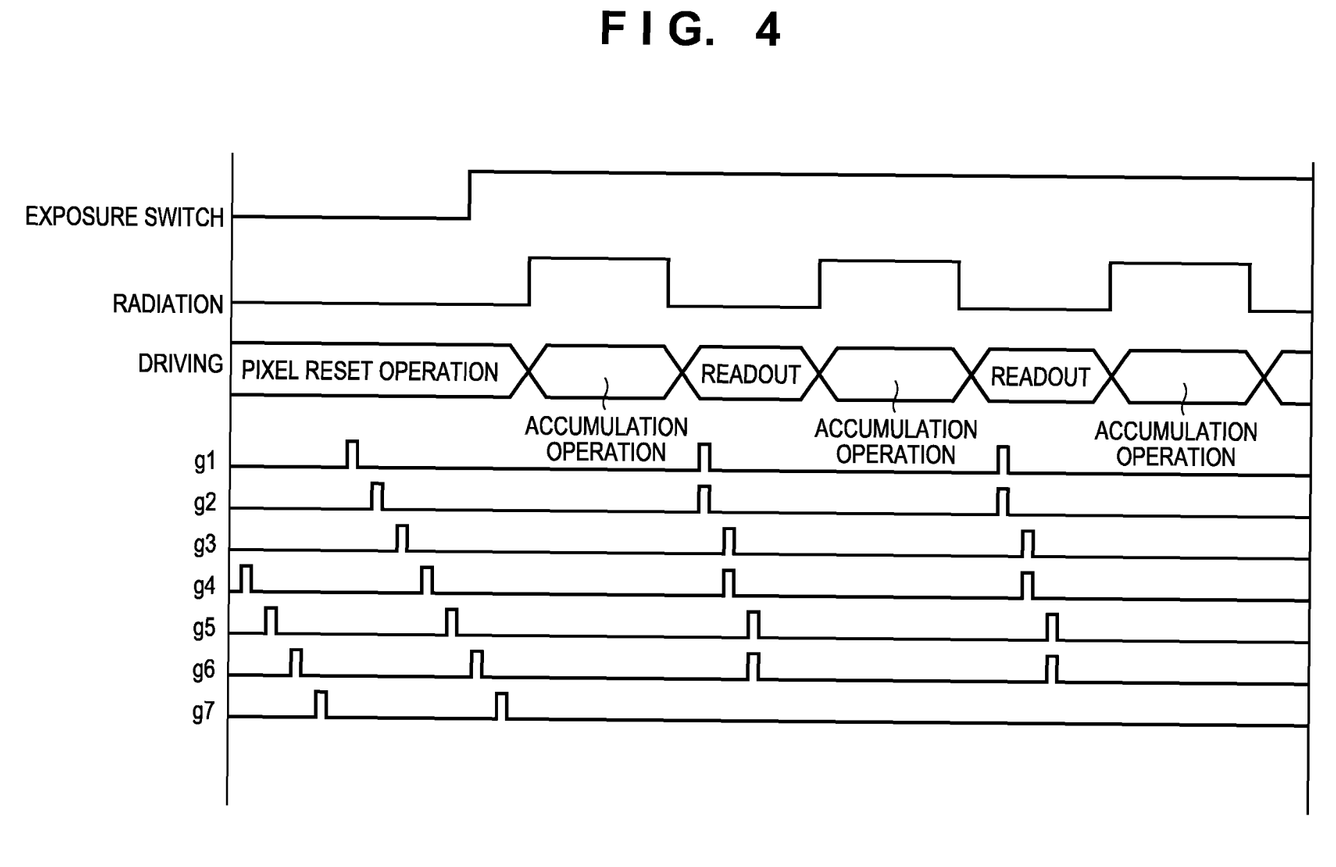
FIG. 4 is a timing chart of the radiation imaging apparatus according to the first embodiment.

The outline of the basic operation of a case in which an image capturing operation is to be performed by synchronizing a radiation generation apparatus 200 and the radiation imaging apparatus 300 will be described next with reference to FIG. 4. Cases which perform image capturing in synchronization with radiation exposure includes, for example, moving image capturing such as fluoroscopy, cineradiography, imaging by digital angiography (DA), imaging by digital subtraction angiography (DSA), and the like. In a case in which synchronized image capturing is to be performed, an accumulation operation and a readout operation are alternately repeated in synchronization with the radiation exposure. The accumulation operation is executed in synchronization with the radiation exposure and the accumulation operation will be performed again in synchronization with the radiation exposure after the readout operation of the accumulated signals have been performed. Also, as shown in FIG. 4, the readout speed can be increased by performing binning by simultaneously setting the plurality of row selection lines 15 to the active level at the time of the readout operation. The readout speed has been increased in the example shown in FIG. 4 by driving a set of lines g1 and g2, a set of lines g3 and g4, and a set of lines g5 and g6, respectively, to the active level simultaneously at the time of the readout operation. Binning is advantageous when high-speed readout of signals is to be performed at predetermined frame rate such as in the case of moving image capturing.

Figure 5:
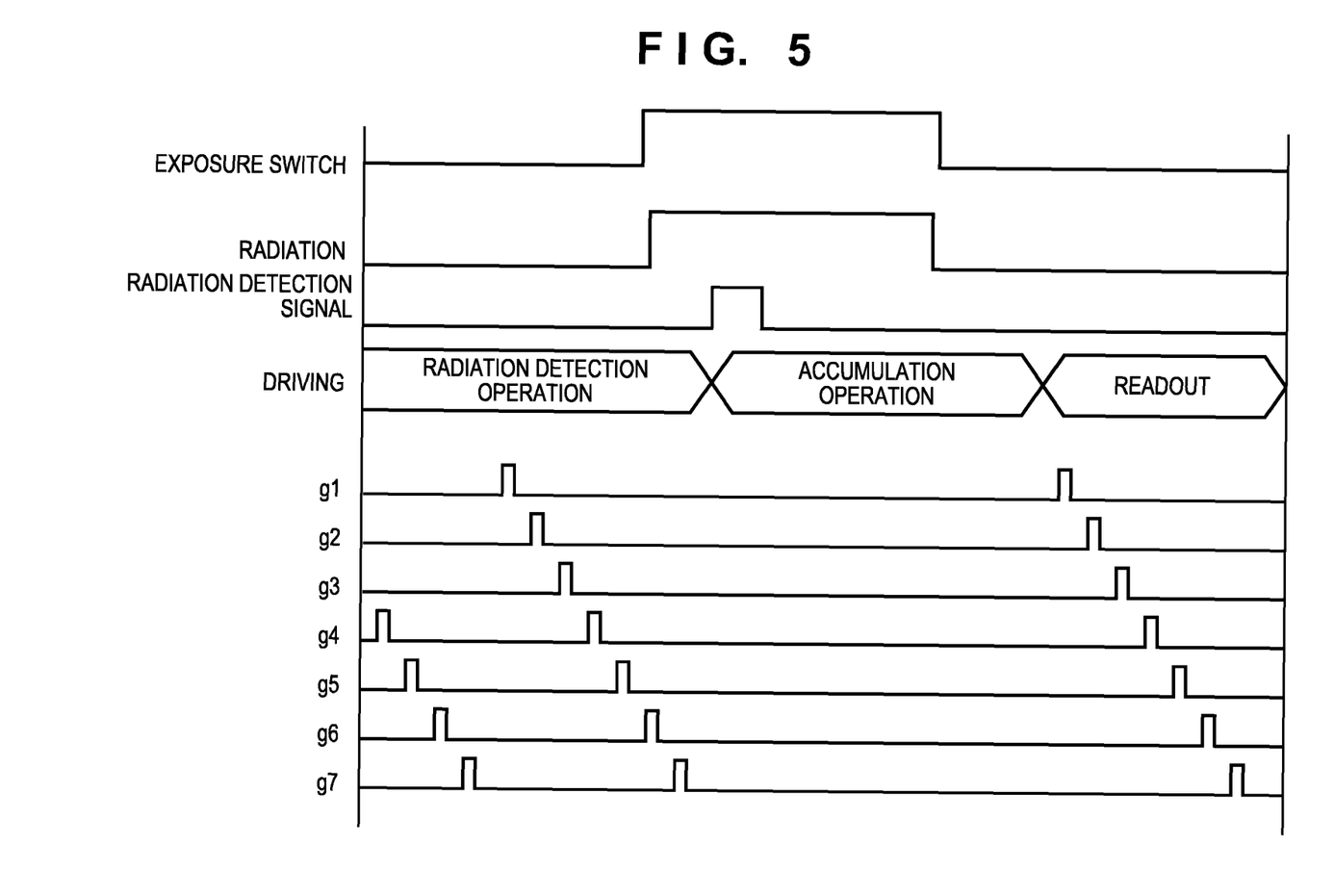
FIG. 5 is a timing chart of the radiation imaging apparatus according to the first embodiment.

An example in which the start of radiation exposure is detected in the radiation imaging apparatus 300 by detecting a current flowing in the bias line will be described with reference to FIG. 5. A bias circuit 9 in the radiation imaging apparatus 300 has a function of detecting a current (bias current) flowing in a bias line. A radiation detection operation is started when the power of the radiation imaging apparatus is set to ON. In the radiation detection operation, a reset operation that sequentially drives the row selection lines 15 to the active level is being performed in a similar manner to the image capturing operation described above. When a radiation exposure instruction is input to the exposure control unit 5 and the radiation exposure is started from the radiation source 1, the bias current flowing in each bias line changes. This change is detected by the bias circuit 9 which detects the bias current flowing in the bias line 40. Based on the signal generated from the bias circuit 9 based on the bias current, an image capturing control unit 7 controls the row selection unit 20 to simultaneously turn off the switches 13 of the pixel array. As a result, a charge accumulation operation based on the radiation exposure is started. Exposure is stopped and the readout operation is started after a predetermined accumulation period has elapsed or when a predetermined irradiation dose is detected. The readout operation is performed by sequentially setting the row selection lines 15 to the active level to read out the charges accumulated in the photoelectric conversion units 110 of each row to the column signal lines. In a case in which the radiation imaging apparatus 300 is to detect the radiation exposure by using the bias circuit 9 included in the self-apparatus, communication units 6 and 8 shown in FIG. 1 are not used. The radiation generation apparatus 200 and the radiation imaging apparatus 300 need not be connected by the communication units since the radiation imaging apparatus 300 can detect the start of radiation exposure on its own.

In a case in which the radiation exposure operation and the imaging capturing operation are to be synchronized by the communication between an exposure control unit 5 and the image capturing control unit 7, the start of radiation exposure need not be detected by causing the bias circuit to detect a bias current. Also, the synchronization may be controlled by the radiation imaging apparatus 300 and the radiation generation apparatus 200 via the communication units. The radiation exposure operation, the accumulation operation, and the readout operation may also be synchronized by arranging a synchronization signal generation unit and supplying a synchronization signal to the exposure control unit 5 and the image capturing control unit 7.

Figure 6A:
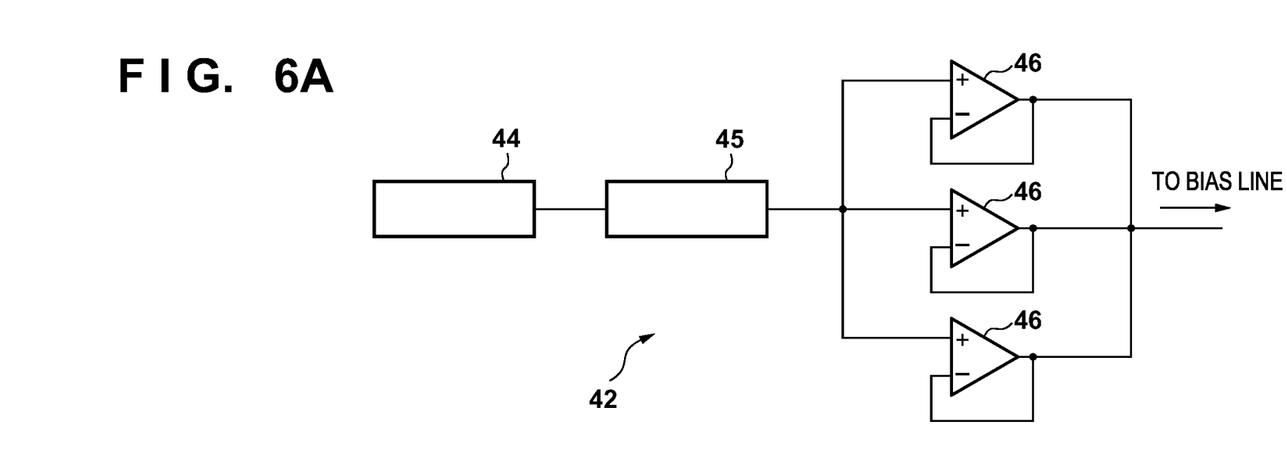
FIGS. 6A and 6B are diagrams showing a bias circuit according to the first embodiment.
Figure 6B:
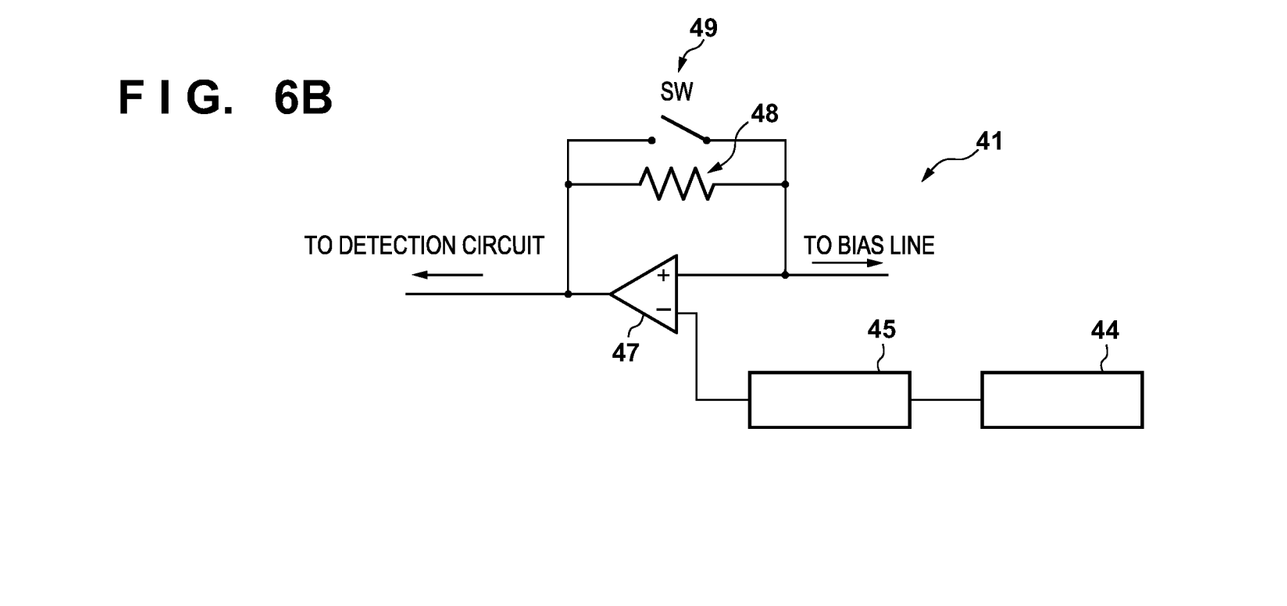

The first bias circuit 41 which has a function of detecting a bias current will be described with reference to FIG. 6B. The first bias circuit 41 includes a bias power supply 44, a low pass filter 45, an operation amplifier 47, and a feedback path. The output from the bias power supply 44 is input as a reference bias potential to the first input terminal of the operation amplifier 47 via the low pass filter 45. The bias line 40 is connected to the second input terminal of the operation amplifier 47. The feedback path connects the second input terminal to the output terminal. A resistor 48 and a switch 49 are connected in parallel to each other in the feedback path. A potential corresponding to the reference bias potential is supplied to the bias line 40 via the feedback path. Since a voltage corresponding to the bias current is generated in the resistor 48 when the switch 49 is open, an output based on the bias current flowing in the bias line appears at the output terminal of the operation amplifier 47. Hence, it is possible to detect the start of radiation exposure by detecting the change in the bias current in accordance with the radiation exposure based on the output from the operation amplifier 47. In times other than the exposure detection time, a potential corresponding to the reference bias potential can be supplied to the bias line by setting the switch 49 to the conductive state and using the operation amplifier 47 as the buffer of the bias power supply. The first bias circuit 41 detects the bias current flowing in the bias line and supplies a bias potential to the bias line in the above described manner. The circuit for detecting the bias current flowing in the bias line includes the resistor 48 and the operation amplifier 47. The resistor 48 and the operation amplifier 47 can generate noise.

The radiation imaging apparatus 300 according to the embodiment includes the first bias circuit 41 and the second bias circuit 42 as the bias circuits. The first bias circuit 41 is a bias circuit which has the function of detecting the bias current flowing in the bias line described above. The second bias circuit 42 is a circuit in which the noise included in the bias potential supplied to the bias line 40 has been reduced compared to that of the first bias circuit 41. For example, a circuit as shown in FIG. 6A can be used as the second bias circuit 42. The second bias circuit 42 includes a bias power supply 44, a low pass filter 45, and a plurality of operation amplifiers 46. The first input terminals of the plurality of operation amplifiers 46 are connected in parallel and the output terminals which are to be connected to the bias line are also connected in parallel. An output from the bias power supply 44 is input as a reference bias potential to the first input terminals of the plurality of operation amplifiers 46 via the low pass filter 45. The feedback path between the second input terminal and the output terminal of each operation amplifier is short-circuited. The noise components generated in the plurality of operation amplifiers are balanced out by bundling the operation amplifiers. In addition, the second bias circuit 42 does not include a resistor for detecting a bias current. Hence, there is less noise included in the bias potential supplied from the second bias circuit 42 to the bias line 40 than that of the first bias circuit 41.

Figure 7:
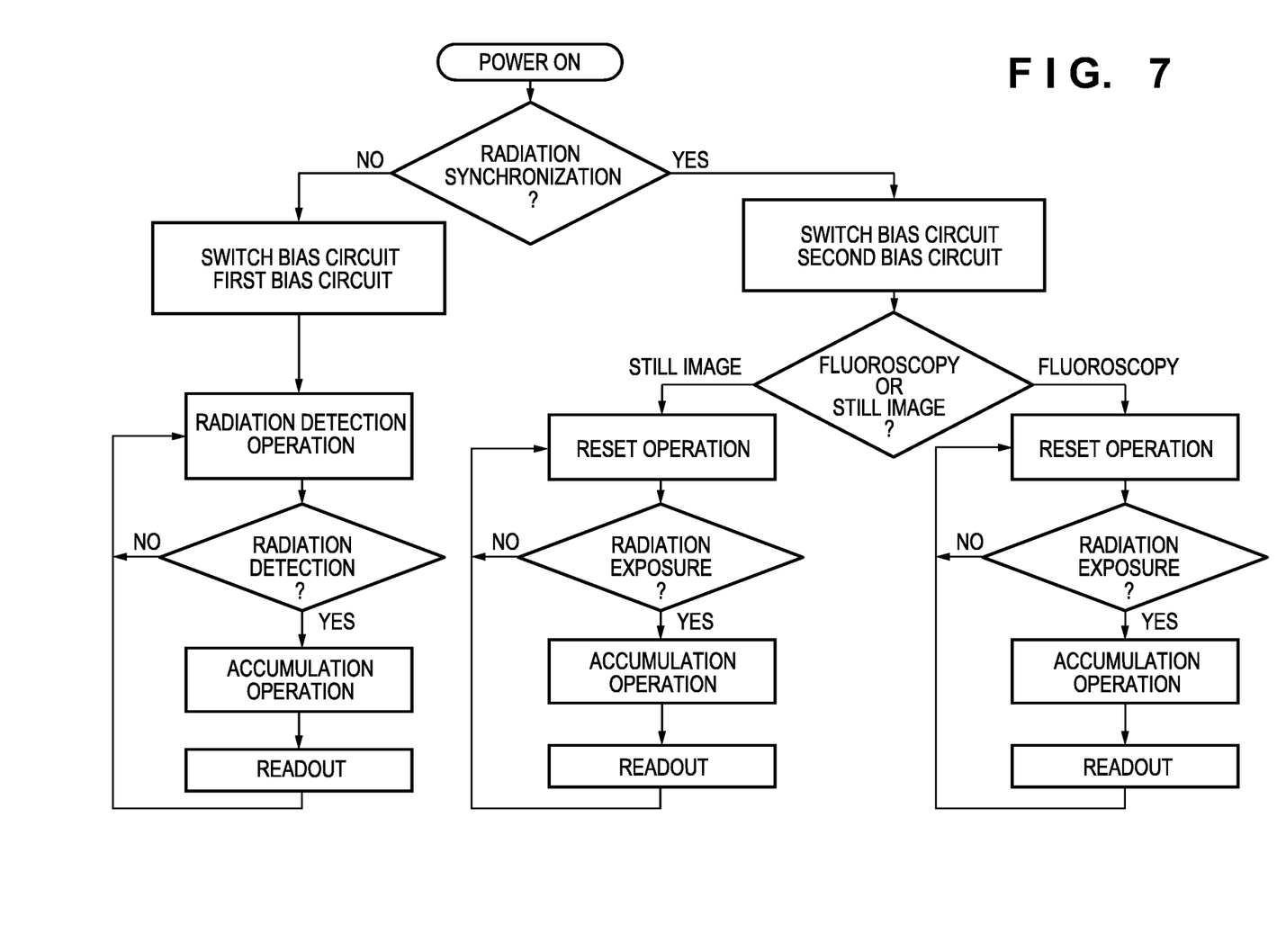
FIG. 7 is a flowchart illustrating an operation according to the first embodiment.

The image capturing operation will be described with reference to FIG. 7 hereinafter. After the power of the radiation imaging apparatus 300 is set to ON, the image capturing control unit 7 determines whether to synchronize the radiation imaging apparatus 300 and the radiation generation apparatus 200. If synchronization is to be performed by the communication units (radiation synchronization=YES), the bias switching circuit 43 connects the second bias circuit 42 to the bias line 40. Subsequently, moving image capturing or still image capturing is performed. If synchronization of the image capturing operation and the radiation exposure operation is to be performed by communication between the radiation generation apparatus 200 and the radiation imaging apparatus 300 or by exchanging synchronization signals, the appearance of noise in the image can be reduced because the second bias circuit 42 will supply the bias potential to the bias line. This is particularly effective when moving image capturing such as fluoroscopy is performed.

On the other hand, if synchronization between the radiation generation apparatus 200 and the radiation imaging apparatus 300 via the communication units is not to be performed (radiation synchronization=NO), the first bias circuit 41 is connected to the bias line 40 to perform image capturing by detecting the start of radiation exposure based on the current flowing in the bias line. Still image capturing is mainly performed when the radiation imaging apparatus 300 is to perform image capturing by detecting the start of radiation detection. Since comparatively larger radiation dose is used at the time of still image capturing than at the time of fluoroscopic image capturing, the influence of the noise generated in the circuit for detecting bias current will be small.

As a method of determining whether synchronization between the radiation generation apparatus 200 and the radiation imaging apparatus 300 will be performed, there is a method of recognizing whether synchronization is possible by confirming the communication state between the radiation imaging apparatus 300 and the radiation generation apparatus 200. Alternatively, there is also a method of linking information as to whether a synchronization signal is to be transmitted between the apparatuses (synchronization image capturing mode) and information as to whether the start of radiation exposure is to be detected by the radiation imaging apparatus (non- synchronization image capturing mode) to the image capturing modes pre-registered in the software for controlling the radiation imaging apparatus 300. In this case, an instruction can be made to the radiation imaging apparatus in accordance with the image capturing mode selected by a user.

Second Embodiment

Figure 8:
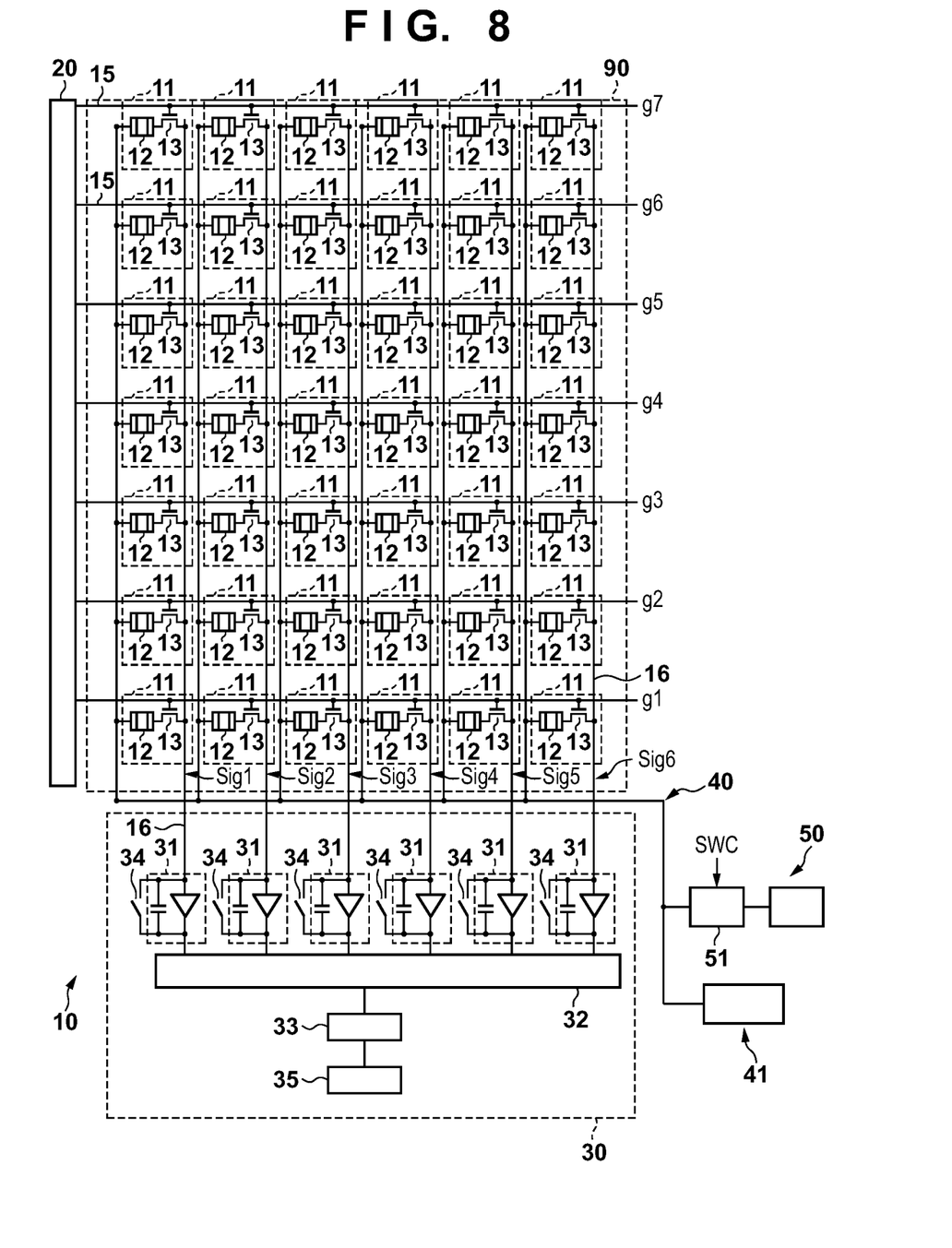
FIG. 8 is a circuit diagram showing a radiation imaging apparatus according to the second embodiment.
Figure 9:
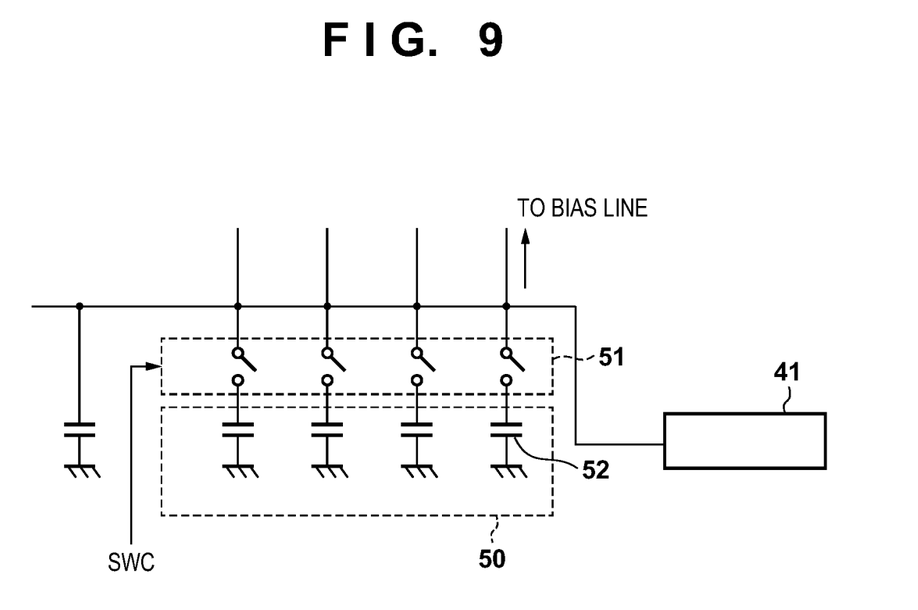
FIG. 9 is a circuit diagram showing a noise reduction circuit according to the second embodiment.

This embodiment will be described with reference to FIG. 8. This embodiment is different from the first embodiment in the point that a noise reduction circuit 50 has been added to a bias circuit instead of a second bias circuit for reducing noise. The noise reduction circuit 50 is a circuit separate from a first bias circuit 41 and is, for example, arranged so as to be connectable/disconnectable to/from a bias line 40 by switches 51. Whether to set each switch 51 to the conductive state or the non-conductive state (connected stated or disconnected state) is controlled by, for example, a control signal SWC transmitted from an image capturing control unit 7. An example of the noise reduction circuit 50 is a circuit formed by capacitors 52 as shown in FIG. 9. Each capacitor 52 connects the bias line from the first bias circuit 41 to a predetermined fixed potential, for example, ground via the corresponding switch 51. This can reduce the noise included in the bias potential from the first bias circuit 41 and suppress a change in the bias potential from the first bias circuit 41. As shown in FIG. 9, a plurality of capacitors 52 can be arranged in a distributed manner. In this example, one capacitor 52 is arranged with respect to each bias line arranged along pixels 11 aligned in the column direction. By distributing and arranging the capacitors 52, it is possible to reduce the influence from the current flowing in the wiring resistance, and the noise reduction effect of the capacitors 52 can be exerted across all the bias lines.

On the other hand, since connecting the capacitors 52 to the bias line 40 reduces the change in the current corresponding to radiation exposure, the detection accuracy of the start of radiation exposure declines because the detection of the current flowing in the bias line 40 at the start of radiation exposure becomes difficult. Hence, it can be made to disconnect the noise reduction circuit 50 from the bias line by the switches 51 in a case in which image capturing is to be performed by detecting the radiation exposure based on the bias current.

Figure 10:
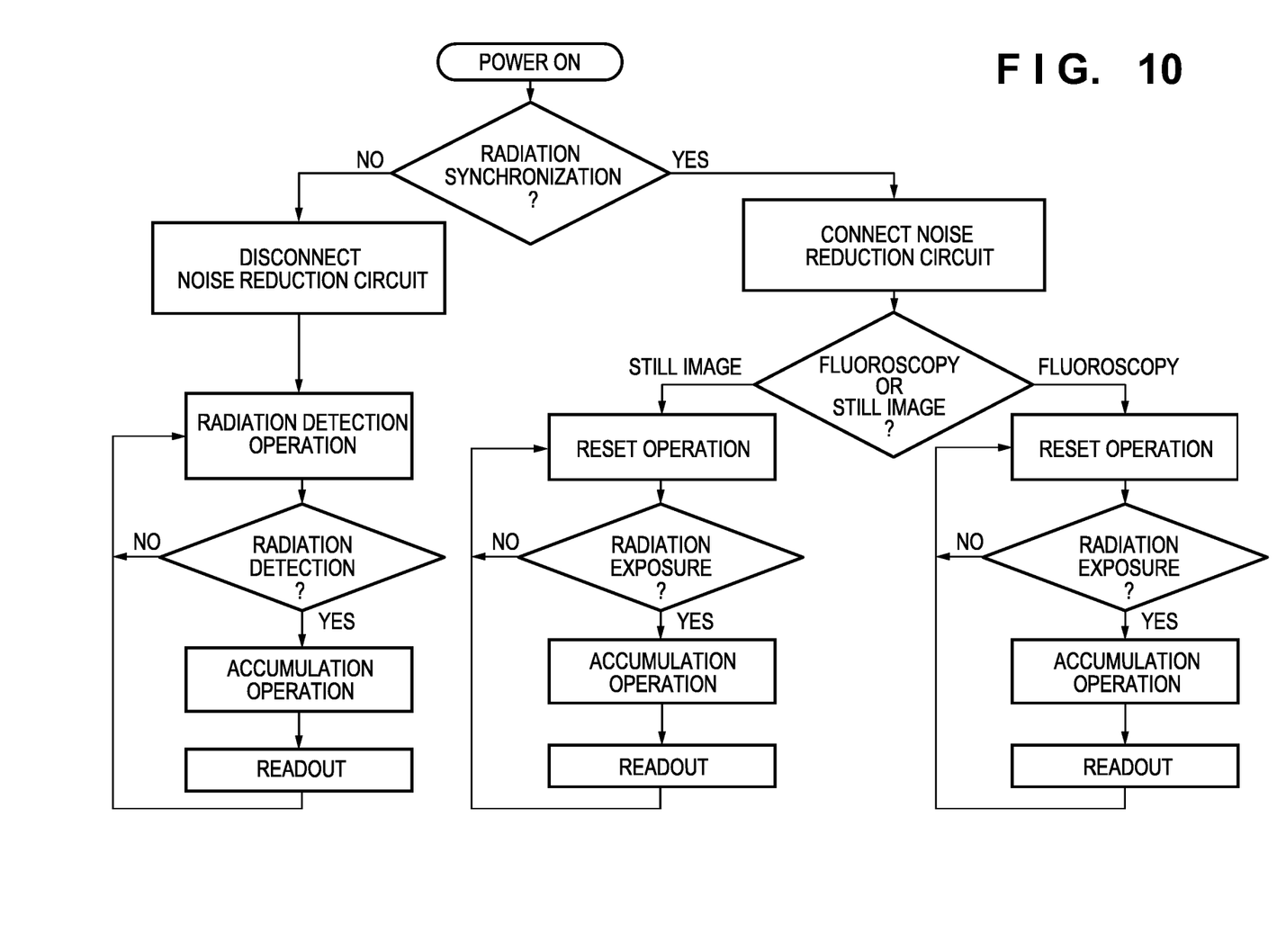
FIG. 10 is a flowchart illustrating an operation according to the second embodiment.

An operation according to this embodiment will be described with reference to FIG. 10. Whether the noise reduction circuit 50 and the bias line 40 are to be connected or disconnected by the switches 51 is determined at the stage in which it is determined whether synchronization between a radiation generation apparatus 200 and a radiation imaging apparatus 300 are to be synchronized. Since the start of radiation exposure need not be detected based on the bias current if synchronization is to be performed (radiation synchronization=YES), image capturing is performed by connecting the noise reduction circuit 50 to the bias line 40 by the switches 51. If synchronization is not to be performed (radiation synchronization=NO), the noise reduction circuit 50 is disconnected from the bias line 40 by the switches 51, and the detection of radiation exposure is performed based on the bias current flowing in the bias line. Subsequently, the operation is performed in a similar manner to that described in FIG. 7.

In a case in which the noise reduction circuit 50 is to be formed by capacitors, the number of capacitors which are connected to the bias line may be changed, and the capacitance of the capacitor and the type of the capacitor may be selected in addition to the number of capacitors. Also, although a circuit formed by capacitors has been raised as an example of a noise reduction circuit, it is also possible to use a noise filter including a ferrite core, and the noise reduction circuit is not limited to a circuit formed by capacitors. Hence, the influence of noise that appears in an image can be reduced by adding a noise reduction circuit to the bias line in accordance with the form of the noise reduction circuit.

Figure 11:
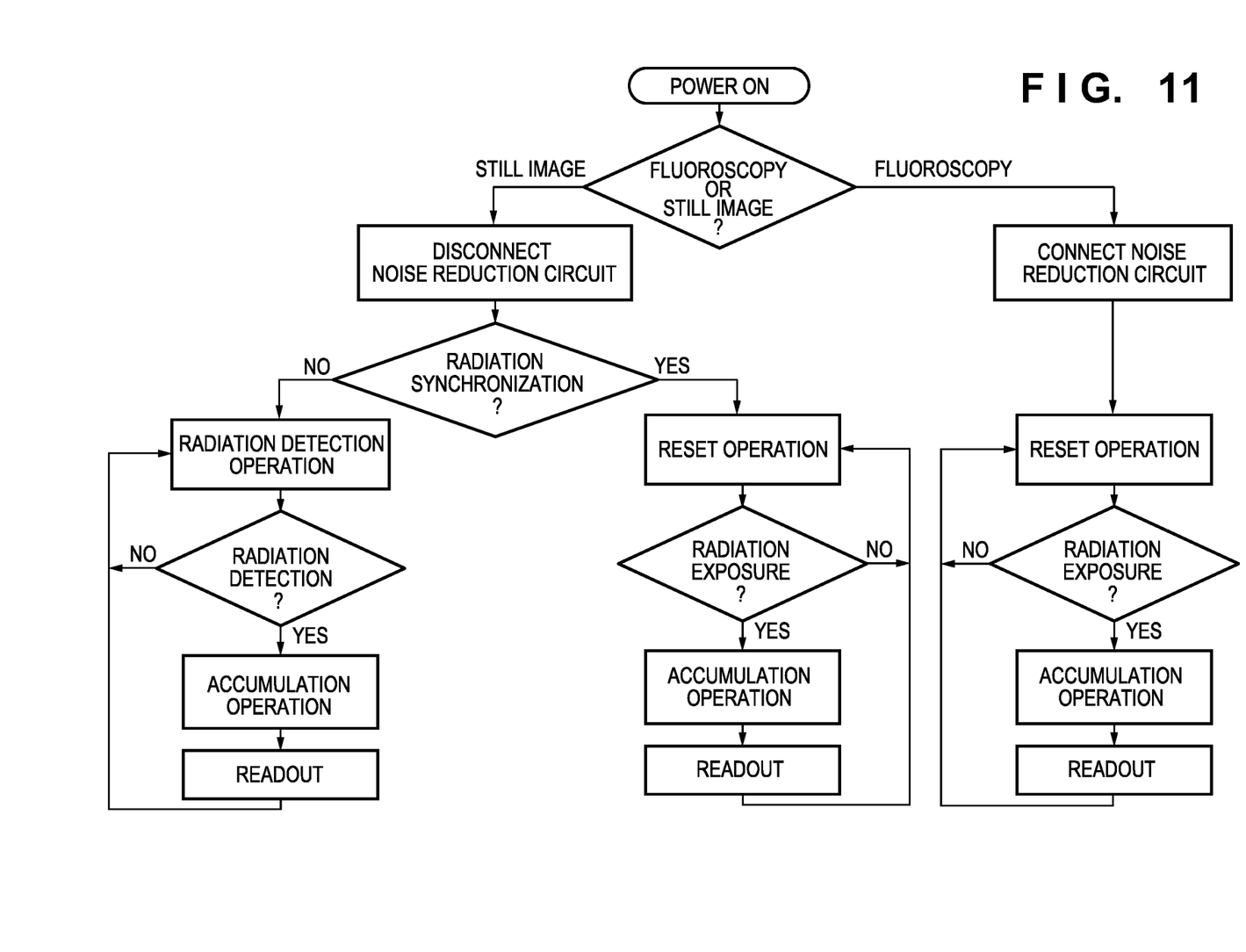
FIG. 11 is a flowchart illustrating an operation according to the second embodiment.

Another example of the switching method of the noise reduction circuit 50 will be described next with reference to FIG. 11. The image capturing method of FIG. 11 differs from that of FIG. 10 in the point that the process of selecting whether to connect or disconnect the noise reduction circuit 50 in accordance with whether moving image capturing (fluoroscopy) or still image capturing is to be performed precedes the process of determining the synchronization or the non-synchronization of the radiation generation apparatus 200 and the radiation imaging apparatus 300. Since the connection/disconnection of the noise reduction circuit 50 to/from the bias line has influence on the activation time of the radiation imaging system, it may be made to perform this process in the upstream stage of the series of image capturing sequences. In this embodiment, a moving image capturing operation can be started earlier by employing a method in which the connection/disconnection of the noise reduction circuit 50 is switched depending on the image capturing method. In a case in which still image capturing is selected, the connection/disconnection of the noise reduction circuit 50 may be selected in accordance with whether synchronization or non-synchronization is being performed. Since it is difficult to appear the noise generated in an image obtained in still image capturing because the radiation dose used in the image capturing operation is comparatively large, it is possible to perform image capturing by setting the noise reduction circuit 50 in the disconnected state in both a case in which image capturing is performed with synchronization and a case in which image capturing is performed without synchronization.

Figure 12:
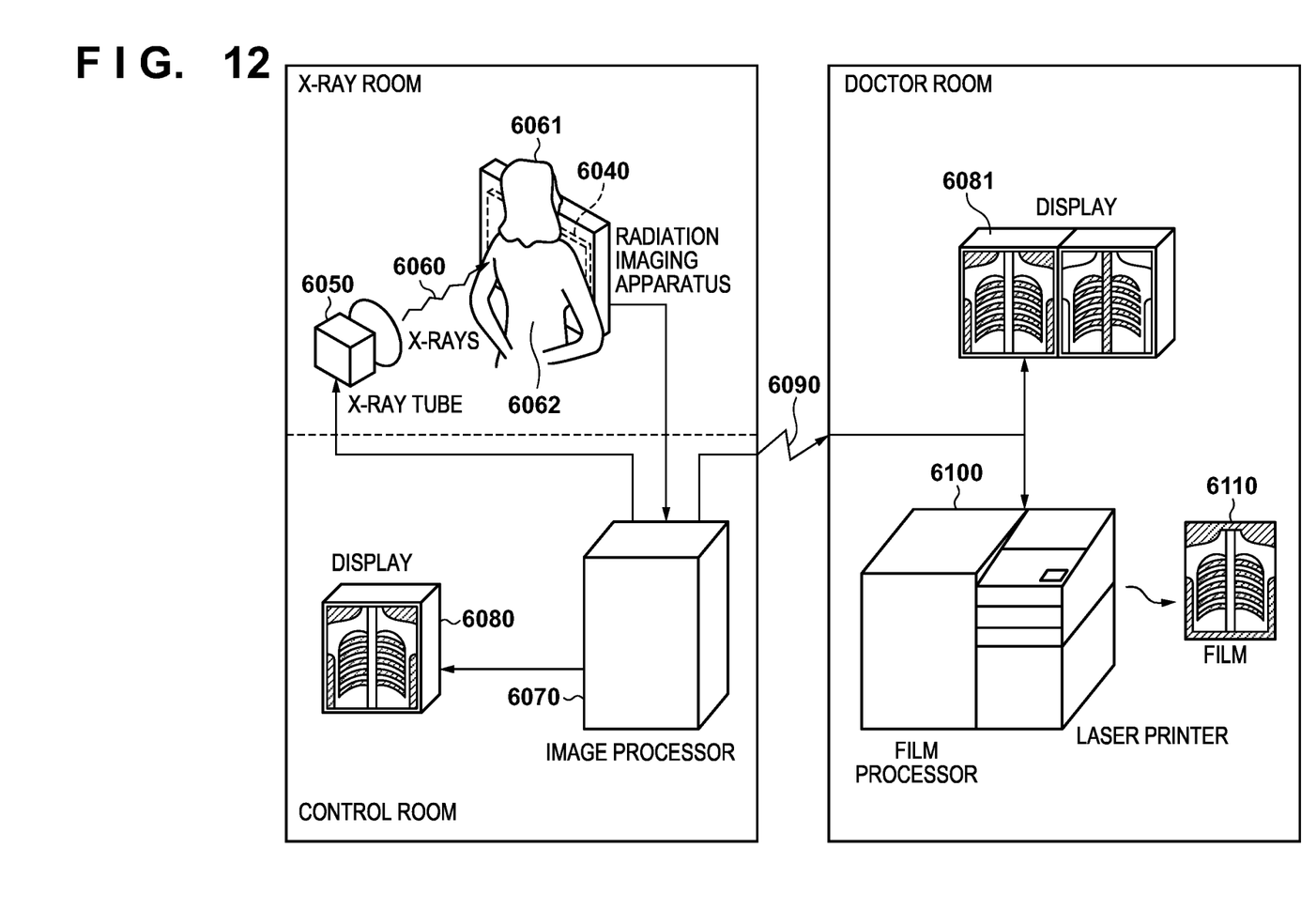
FIG. 12 is a view showing a specific arrangement of a radiation imaging system.

A more specific arrangement of the radiation imaging system will be described next with reference to FIG. 12. An example using X-rays as radiation will be described below. X-rays 6060 generated by an X-ray tube 6050 serving as a radiation source pass through a chest 6062 of a patient or a subject 6061 and enter conversion units 12 included in a radiation imaging apparatus 6040. The X-rays that have entered include information about the inside of the body of the subject 6061. Radiation is converted into charges by the conversion units 12 in correspondence with the incident X-rays to obtain electrical information. This information is converted into digital data, undergoes image processing by an image processor 6070 serving as a signal processing unit, and can be observed on a display 6080 serving as a display unit in a control room. This information can be transferred to a remote place by a transmission processing unit such as a telephone line 6090 or the like and displayed on a display 6081 serving as a display unit in another place such as a doctor's office or stored in a recording unit such as an optical disk, thus allowing a doctor in a remote place to make a diagnosis. Furthermore, the information can also be recorded on a film 6110 serving as a recording medium by a film processor 6100 serving as the recording unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-198711, filed, Oct. 22, 2018, which is hereby incorporated by reference herein in its entirety.

What is claimed is:

1. A radiation imaging apparatus comprising:
   a pixel array arranged with a plurality of pixels including conversion units configured to convert radiation into charges and accumulate the charges;
   a bias line connected to the conversion units of the plurality of pixels;
   a bias circuit configured to supply a bias potential to the bias line and detect a current flowing in the bias line;
   a noise reduction circuit configured to reduce, separately from the bias circuit, noise included in the bias potential from the bias circuit; and
   a switch configured to connect the noise reduction circuit to the bias line.

2. The apparatus according to claim 1, wherein the noise reduction circuit includes a capacitor.

3. The apparatus according to claim 2, wherein the capacitor connects the bias line to a predetermined fixed potential via the switch.

4. The apparatus according to claim 1, wherein the bias circuit includes an operation amplifier and a feedback path,
   the operation amplifier includes a first input terminal to which a reference bias potential is applied, a second input terminal connected to the bias line, and an output terminal, and the feedback path is connected to the output terminal and the second input terminal to supply a potential corresponding to the reference bias potential from the output terminal to the bias line via the feedback path, thereby detecting the current flowing in the bias line based on an output from the output terminal.

5. The apparatus according to claim 1, further comprising:
   a control unit configured to control the switch;
   an exposure control unit configured to control radiation exposure; and
   a communication unit configured to communicate with the exposure control unit,
   wherein the control unit controls the switch to disconnect the noise reduction circuit from the bias line when a mode for performing image capturing by detecting radiation exposure by the current flowing in the bias line is selected, and
   the control unit controls the switch to connect the noise reduction circuit to the bias line when a mode for performing image capturing by recognizing the radiation exposure by the communication is selected.

6. The apparatus according to claim 1, further comprising:
   a scintillator configured to convert the radiation into light, wherein each of the conversion units includes a photo-electric conversion unit configured to convert the light into an electrical signal.

7. The apparatus according to claim 6, wherein the scintillator is arranged on a side which is exposed to the radiation with respect to the conversion units.

8. The apparatus according to claim 6, wherein the scintillator is arranged on a side opposite to a side which is exposed to the radiation with respect to the conversion units.

9. A radiation imaging system comprising:
a radiation source configured to generate radiation; and
a radiation imaging apparatus defined in claim 1.

* * * * *